United States Patent

[11] 3,577,176

| [72] | Inventors | Marvin L. Kreithen |
| | | Feasterville; |
| | | John J. Lawler, Newportville, Pa. |
| [21] | Appl. No. | 724,556 |
| [22] | Filed | Apr. 26, 1968 |
| [45] | Patented | May 4, 1971 |
| [73] | Assignee | Compudyne Corporation |
| | | Hatboro, Pa. |

[54] CONSTANT CURRENT STEP MOTOR SYSTEM
7 Claims, 8 Drawing Figs.

[52] U.S. Cl. .................................................. 318/432, 318/685
[51] Int. Cl. ........................................................ H02p 7/06
[50] Field of Search .......................................... 318/138, 254, 439, 430, 432, 434; 310/49

[56] References Cited
UNITED STATES PATENTS

| 2,421,632 | 6/1947 | Livingston | 318/432 |
| 3,373,330 | 3/1968 | O'Brien | 318/432 |
| 3,355,646 | 11/1967 | Goto | 318/138 |
| 3,368,128 | 2/1968 | Parrish | 318/138 |
| 3,424,961 | 1/1969 | Leenhouts | 318/327X |
| 3,452,263 | 6/1969 | Newell | 318/138 |

*Primary Examiner*—G. R. Simmons
*Attorney*—Howson and Howson

ABSTRACT: In a control circuit for a step motor, current through the motor windings is sensed by voltage drop across a series resistor. This voltage is used to control a feedback circuit which regulates the power supply in such a way that the output torque of the step motor remains constant. Preferably the potential across the series resistor is compared with a voltage reference. Any error signal generated as a result of a difference is used to generate pulses at a frequency proportional to the error voltage derived from the sensing resistor. These pulses are synchronized with a rectified alternating current input and are used to determine and select whatever part of that input, if any, will be used to supplement available current to maintain constant the torque of the step motor.

PATENTED MAY 4 1971
3,577,176
SHEET 1 OF 2
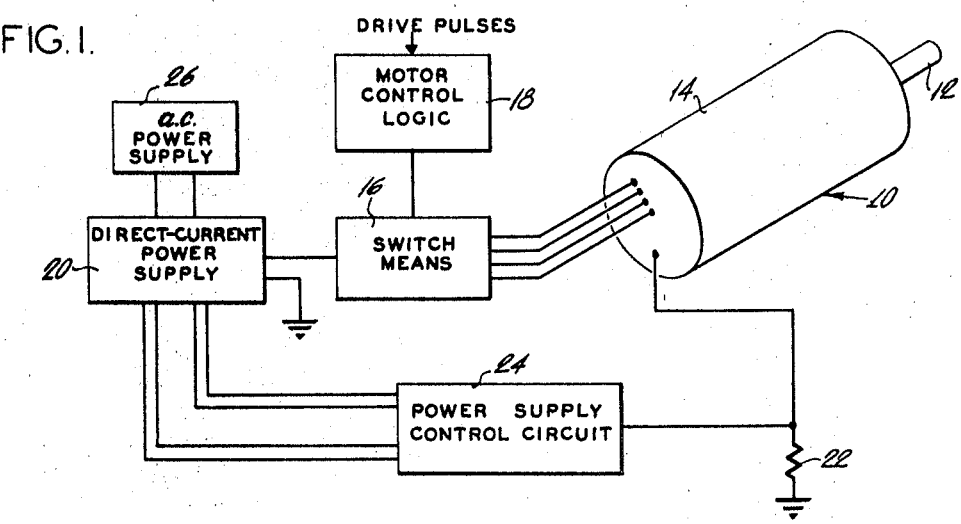
FIG.1.
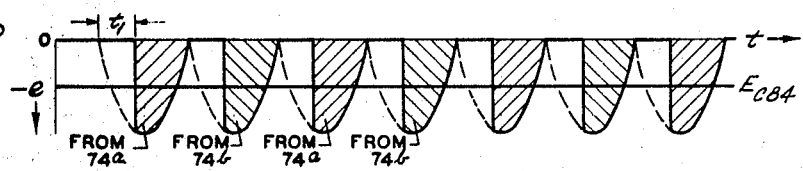
FIG.3.b
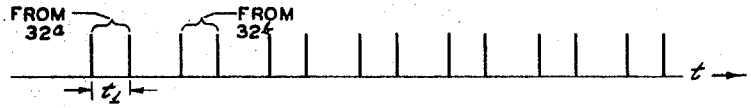
FIG.3.a
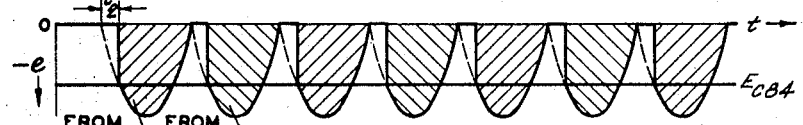
FIG.4.b
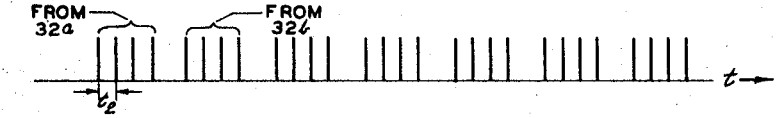
FIG.4.a
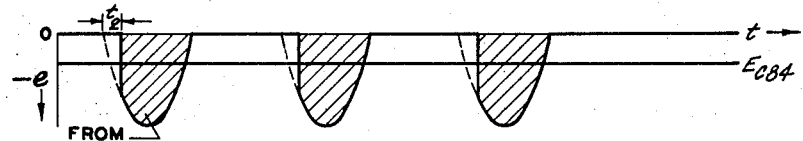
FIG.5.b
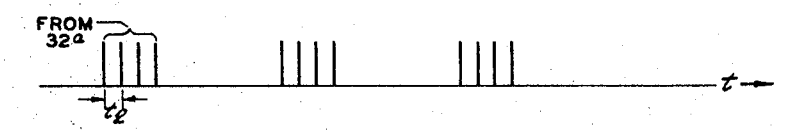
FIG.5.a
INVENTORS:
MARVIN L. KREITHEN
JOHN J. LAWLER
BY
Howson & Howson
ATTYS.

INVENTORS:
MARVIN L. KREITHEN
JOHN J. LAWLER
BY
Howson & Howson
ATTYS.

CONSTANT CURRENT STEP MOTOR SYSTEM

The present invention relates to improvement in step motor control circuits. More specifically the present invention relates to a step motor control circuit wherein torque is maintained constant by regulation by means of feedback of the current from the power supply to the motor windings. The present invention is also directed to the nature of the feedback circuit and its various parts and the method of maintaining constant the torque of the step motor.

Step motors are being used with increasing frequency in applications such as numerically controlled machine tools. In such applications it has not been possible to maintain constant torque of the step motor at different speeds of operation. More specifically, as the speed of the motor increases, the reactive impedance of its windings increases. Because the output torque is proportional to current through the windings, the torque reduces as speed increases so that the effective force of a cutting tool, for example, is much reduced as speed increases, giving uneven results in its machining.

Attempts have been made in various ways to obtain more uniform torque output. One technique of the prior art for correcting this effect has been to place a variable resistance in series with the winding which is varied so that resistance decreases with increase in speed. Thus motor winding current which is proportional to torque is maintained more nearly uniform at various speeds but it is virtually impossible to maintain constant current with this technique. Among other disadvantages, this technique consumes much power particularly at slower speed and at rest where the motor ordinarily operates most of the time in a machine tool application.

In the recent prior art there has been an attempt to solve the problem in another way. U.S. Pat. No. 3,355,646 discloses a means whereby the frequency of the pulses, by which the motor is driven and which therefore determine its speed, is used to modify the power supply to adjust current level supplied to the motor windings. This system represents an improvement but does not produce a constant torque output. Even though the extremes of torque variations may be lessened without undue consumption of power, variations still exist with the consequences of uneven machining.

The present invention employs means for sensing the current through the step motor windings, which current, in turn, determines the torque. This sensing is preferably done by using a series resistor in order to obtain a variable voltage proportional to the current in the step motor windings. This variable voltage, in turn, is smoothed and compared with a standard voltage representative of a desired current level. Any difference between the voltages provides an error signal which is used to generate a chain of feedback pulses, the frequency of which at any moment is proportional to the error or deviation in the current through the windings from the predetermined standard. These feedback pulses, in turn, are synchronized with a rectified alternating current voltage from the AC power supply and are used effectively to eliminate portions (which vary with pulse frequency) from the front of each successive AC voltage wave. The resulting voltage is smoothed and added to a constant DC power supply output. Consequently, the amount of current which is fed to the windings of the step motor is controlled and modified by the feedback in such a manner that the torque of the motor is maintained constant.

As a consequence of the present invention, the output shaft torque of the step motor does not decrease as the motor speed increases. The present invention provides means which continually monitors the output torque of the step motor by measuring the step motor winding current by means of the voltage drop of a small series resistor. The invention provides means for continually comparing the output torque of the step motor with a preselected desired level of output torque. The invention provides means for automatically increasing the power to the step motor when the output torque of the motor tends to decrease below a predetermined level. This is all done by means which does not cause degeneration of quality of the voltage which is supplied to the step motor actuating windings.

More specifically, the present invention relates to a constant current drive system for a step motor having a rotor and a plurality of windings which, when energized in specific sequence, will cause the motor to rotate in one direction an incremental step at a time. A power supply produces driving voltage and switch means connects that power supply selectively and in a predetermined sequence to each of said windings. Motor control logic responsive to drive pulses is operative upon the switch means to cause said switch means to connect the power supply to the windings in proper sequence to produce successive incremental movements of said rotor. Sensing means senses the amount of current passing through the windings and feedback means, responsive to the sensed current, acts upon the power supply to adjust the current passing through the windings to provide for uniform current at all times.

The present invention also relates to the method of producing uniform drive torque in a step motor having a rotor and a plurality of windings which, when energized in specific sequence, will cause said rotor to rotate in one direction an incremental step at a time. This is done by supplying a driving voltage and applying that voltage to the motor windings in predetermined sequence in response to pulses of a drive signal. The current level in the windings is then sensed and a signal representative of this current level is fed back to modify the driving voltage to maintain a uniform current level in the windings.

For a better understanding of the invention reference is made to the accompanying drawings in which FIG. 1 is a block diagram illustrating generally the circuit in which the present invention is employed;

FIG. 3a is a plot against time of feedback pulses generated in the pulse generating portion of the feedback circuit of FIG. 2;

FIG. 3b is a plot against time of voltage output from the rectified full-wave switch controlled power supply portion of the circuit of FIG. 2 showing the effect of application of the feedback pulses of FIG. 3a to the switch;

FIG. 4a is a plot similar to FIG. 3a of feedback pulses at a different frequency;

FIG. 4b is a plot against time similar to FIG. 3b of voltage output modified by the feedback pulses of FIG. 4a;

FIG. 5a is a plot of feedback pulses to the half-wave rectifier circuit;

FIG. 5b is a plot against time of voltage output from a rectified half-wave switch in controlled power supply portion of the circuit of FIG. 2 showing the effect of the application of the feedback pulses of FIG. 5a to the switch.

Figure 2:
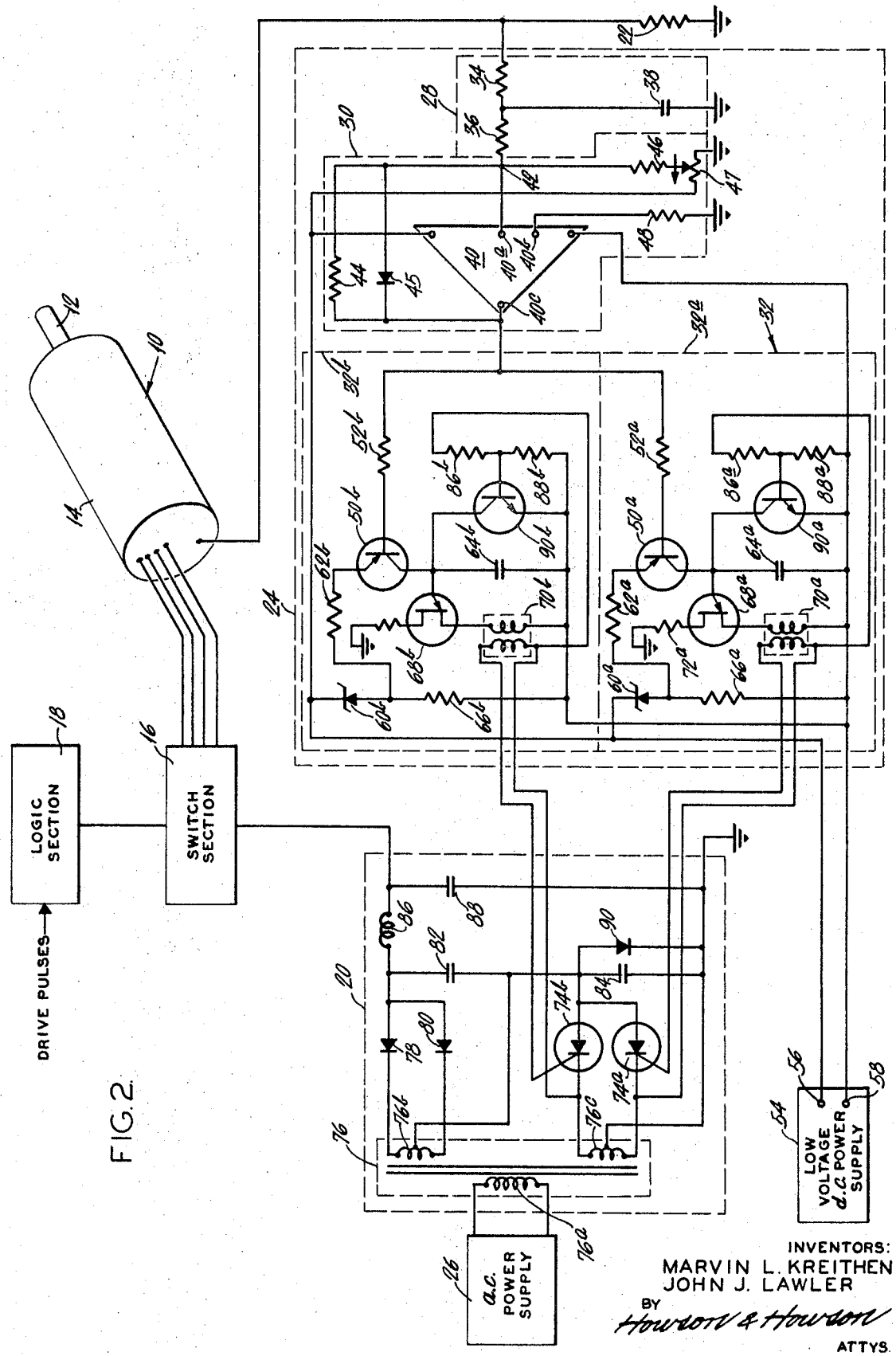
FIG. 2 is a similar diagram showing in greater detail the parts of the circuit in which improvements have been made.

Referring to FIG. 1 a step motor, generally designated 10, is shown highly schematically together with a control circuit, components of which are represented by blocks.

The step motor may be of a type such as that described in U.S. Pat. No. 3,117,268. Such a motor may be of the synchronous inductor type having a permanently magnetized rotor including an output shaft 12. The stator includes a plurality of poles disposed around the periphery of the rotor and associated with the respective stator windings. These windings selectively magnetize the respective stator poles sequentially in a predetermined pattern to cause the motor to move in steps. The windings in the stator 14 have not individually been shown but it will be understood that each of the windings is sequentially connected by the switch section 16 in response to programming from motor control logic 18 to the direct current power supply 20. The control logic 18 is arranged to respond to drive pulses by programming the switch section to sequentially connect the stator windings to the direct current power supply to move the motor shaft in a selected direction an incremental step at a time. The motor will be moved one incremental step for each drive pulse received by the control logic. Effectively the input drive pulses to the motor control logic 18 sequentially open and close in proper sequence the switches which connect the direct current power supply 20 to the stator windings. Rotation of the shaft will continue as long as a chain of drive pulses is impressed upon the coils and the speed of rotation will be dependent upon the frequency of the pulses. The torque, or turning power of the shaft is determined by the current supplied from the power supply. The number of windings in the stator 14 may differ with different types of motors and the exact construction of the step motor may be varied, but present invention remains applicable.

The present invention differs from the prior art in that it uses means to sense the current passing through the stator windings to provide a feedback to correct the power supply output. The sensing means preferably takes the form of a small resistor 22 and uses the voltage sensed across the resistor 22 for comparison with a standard. Departure from the standard indicates an error which is used by the feedback circuit to modify the direct current power supply in such a way as to change the average current to the stator windings so that the torque output will remain constant at different operational speeds of the step motor. This is preferably done by providing a supplemental power supply using rectified alternating current derived from the AC power supply 26 and by variably eliminating part of each rectified sinusoidal wave in order to adjust the amount of average voltage available to the stator windings through the switch section 16.

When the stepping motor 10 is to rotate an increment, a drive pulse is fed to the motor control logic 18 which acts on switch section 16 to cause it to connect the direct current power supply 20 to a selected stator winding of step motor 10. Subsequent drive pulses are directed by switch section 16 in a sequence, determined by the motor control logic 18, to the proper stator winding to advance the stator an additional step. The logic 18 causes the switch section to respond as quickly as pulses are applied. The speed of rotation increases with pulse frequency. When the final drive pulse of a series is emitted to the motor control logic 18, the motor shaft 12 will stop and the switch section 16 will keep the direct current power supply connected to the last selected stator winding which will therefore remain energized.

The inductive impedance of each of the motor coils is essentially zero when the shaft is not rotating. In order to prevent excess current flowing through the windings in this case, it is common in the step motor control art to place a load resistor in series connection with the integrally contained step motor windings. The use of this load resistor in the present invention as current level sensing element for a feedback circuit to maintain constant current is new.

When the shaft 12 rotates, the inductive impedance of each winding increases with increasing rotational speed and the current flowing through each winding decreases with increasing rotational speed. As the torque of shaft 12 is proportional to the current through the windings, the torque also decreases with increasing rotational speed. In order to maintain torque constant as the rotational speed is changed, this invention modifies the direct current power supply 20 to maintain sufficient current through the motor windings to produce a constant level of torque over a range of motor rotation speeds. In practice this involves monitoring the torque level, comparing the actual torque level to a desired torque level, and adjusting the voltage output of the direct current power supply 20.

FIG. 2 shows a preferred embodiment of the system generally illustrated in FIG. 1. Many portions of the system which are conventional are shown schematically. The circuitry of portions which are novel or are related to areas of novelty are shown in greater detail. It will be appreciated that this is a preferred embodiment and that other systems quite different from this one but within the broad concept of the invention may be employed and modifications of the details of the device shown and described may also be employed.

The current through the motor windings is sensed by the voltage drop across resistor 22. Resistor 22 is connected to ground so that voltage from its opposite end is measurable relative to the common ground.

The voltage which appears across the resistor has a time varying characteristic. Therefore a smoothing circuit 28 is provided to eliminate extremes and average the potential across resistor 22. This averaged voltage is fed to an input terminal of a voltage comparator, generally designated 30, in the form of an operational amplifier. Comparison is made with a set predetermined voltage and, if the averaged voltage drop across resistor 27 departs therefrom, an error signal is generated as a voltage signal. This signal, in turn is fed to a pulse-generating circuit 32 which is basically a relaxation oscillator circuit which responds by generating pulses, the frequency of which is directly proportional to the voltage of the error signal output from comparator 30. These pulses are synchronized with the AC power supply as will appear below. The pulses are fed to electronic switch means in the direct current power supply to modify the voltage output of that supply as will be described hereafter.

The smoothing filter 28 consists of a T-network of series resistors 34 and 36 and a capacitor 38 connected between ground and a point intermediate the resistors 34 and 36. The values of these components and others in the circuit will depend upon the value of the resistor 22 and current and voltage values involved with that resistor and other circuit elements.

The voltage comparator 30 includes operational amplifier 40 supplied low voltage direct current potential from power supply 54 and having inverting and noninverting input terminals 40a and 40b, respectively, and an output terminal 40c. Terminal 40b is connected to ground through stabilizing resistor 48 and will be at zero potential since essentially no current is intended to flow through resistor 48. Connected to the inverting terminal 40a is the junction point 42 at which the output of filter 28, parallel connected feedback resistor 44 and diode 45, and potentiometer 46 are all connected together. Because the voltage from the power supply to the motor is always of negative polarity, the current sensing resistor 22 will provide a potential negative with respect to ground to the filter and to the junction point 42.

The voltage supplied to the junction point 42 by the resistor 22 under the conditions where current is maximum (i.e., where the rotor is stationary but energized) is larger than the potential supplied by potentiometer 47 through resistor 46 and of opposite sign. Therefore, a negative potential difference at the junction point 42 (and input terminal 40a) generates a positive output voltage at terminal 40c of operational amplifier 40 sufficient to feed back through resistor 44 enough current to make the potential at junction point 42, and therefore at terminal 40a, equal to zero, the potential on terminal 40b. Potential difference between the output terminal 40c and junction point 42 causes a current to flow through resistor 44 which results in a change of potential at junction 42 (and terminal 40a) which reduces the negative voltage at junction point 42. This voltage reduction has the effect of reducing the positive output voltage at terminal 40c. During operation the voltage at inverting terminal 40a is compared with the negative voltage on the noninverting terminal 40b of the operational amplifier 40. Since the voltage at terminal 40a is less than the voltage at terminal 40b, comparator 40 will produce a positive voltage at terminal 40c the size of which will vary with the potential across resistor 22. As the voltage across resistor 22 decreases the voltage at terminal 40a will become less negative and the voltage at terminal 40c will become less positive.

The output of the voltage comparator 40 is impressed upon the pulse generator circuits 32. These are two similar circuits in the pulse generator which have been subdivided into boxes 32a and 32b. It will be understood that the circuits within these boxes are intended to be identical so that corresponding elements designated by corresponding number designators, but with different suffixes, have the same function and operations. The output of the voltage comparator then is fixed to each of the pulse generating circuits 32a and 32b and specifically to the base of each of the transistors 50a and 50b through resistors 52a and 52b, respectively. When the output voltage of comparator 30 to the bases of transistors 50a and 50b exceed the voltage applied to its emitters of these transistors, they will be biased into a nonconductive state. When the output voltage of comparator 30 to the bases of transistors 50a and 50b is less than the emitter voltages of these transistors, they are biased into the conductive state.

Since the elements of circuits 32a 32b are the same, a description of the circuits 32a will be understood to apply equally well to that of circuit 32b. Resistors 66a and zener diode 60a provide a voltage regulator to supply voltage to the emitter of transistor 50a which determines the point at which this transistor will conduct. When the transistor 50a is switched to its conducting state, it draws current from low voltage power supply 54, and specifically from the positive terminal 56 thereof, through zener diode 60a, current limiting resistor 62a, and the transistor 50a to charge capacitor 64a. Capacitor 64a is connected to the negative terminal 58 of the low voltage power supply 54. Transistor 50a acts as a variable resistance and its emitter-to-collector resistance varies inversely with the value of the voltage on its base produced by the comparator 30. As the positive output voltage of the comparator 30 decreases, the emitter-to-collector resistance of the transistor decreases, and the charging time of the capacitor 64a also decreases.

The purpose of charging capacitor 64a is to build up a sufficient charge to trigger unijunction transistor 68a. The rate at which this occurs will depend upon the effective combination of resistance of the resistor 62a and emitter-to-collector resistance of the transistor 50a. The lower the effective resistance of transistor 50a, the more quickly the capacitor 64a is charged and the sooner the firing potential of the unijunction transistor 68a is reached.

The nature of the unijunction transistor is such that when the threshold voltage level is reached for triggering, a low resistance discharge path for the capacitor 48 is created through the primary of pulse transformer 70a. When enough charge has been removed from the capacitor 64a to reduce the voltage level at the emitter of the unijunction transistor 68 below its turnoff level, the unijunction transistor rapidly ceases to conduct. The resistor 72a is connected between the base of unijunction transistor 68a and ground to provide bias for the base of that transistor.

A sudden transient current develops through the primary of transformer 70a as the capacitor discharges through it, a spikelike pulse is generated in the secondary windings of transformer 70a.

It will be appreciated that the unijunction transistor provides in effect a relaxation oscillator. It is the nature of this unijunction transistor that when conduction begins it will permit relatively high current flow through itself for a short period of time from the capacitor 64a. When enough charge has been removed from capacitor 64a to reduce the voltage level at the emitter of the unijunction transistor 68a below the turnoff level of the unijunction transistor, the unijunction transistor will rapidly cease to conduct. The capacitor then resumes charging and the cycle continues to repeat itself as transistor 50a is biased to conduct or until the capacitor is effectively short circuited. The pulse rate from pulsing circuit 32a will vary directly with the charging rate of capacitor 64a which also varies inversely with the positive voltage output of comparator 30.

Diode 45 which has its anode connected to terminal 40a and its cathode connected to terminal 40c, limits the decrease value of the positive voltage produced at the output terminal 40c of operational amplifier 40. This is necessary to make certain that the charging time of capacitor 64a never becomes less than the discharging time through the unijunction transistor 68a. If this situation was not prevented, the unijunction transistor would remain on during the entire conducting time of SCR 74a.

The pulse induced in the secondary winding of transformer 70a is applied between the trigger (gate) electrode and cathode of the silicon controlled rectifier (SCR) 74a of the direct current power supply 20. Another type of electronic trigger-actuated device may, of course, be substituted for the SCR. The silicon controlled rectifier 74a will conduct upon application of the trigger pulse and continue to conduct as long as there is potential of the proper polarity between its anode and cathode.

It is understood of course that pulses are generated in exactly the same way in pulse generating circuit 32b for application to the trigger of SCR 74b as they are in pulse generating circuit 32b for application to the trigger electrode of SCR 74a.

The direct current power supply of which silicon controlled rectifiers 74a and 74b are parts has two sections. Both sections derive their power initially from AC power supply 26 through transformer 76 having primary winding 76a and secondary windings 76b and 76c. Continuous power at uniform voltage is provided by the section which combines diodes 78 and 80 with the center taped secondary coil 76b to form a single phase, push-pull rectifier circuit whose output voltage appears as a pulsating rectified voltage. The anodes of diodes 78 and 80 are connected to the negative plate of the capacitor 82, and the center tap of secondary winding 76b is connected to the positive plate thereof. Supplemental power at a voltage variable in response to feedback pulses is provided by the section which combines the silicon-controlled rectifiers 74a and 74b with the center tapped secondary winding 76c of transformer 76 to form a single phase push-pull rectifier. The supplemental power voltage is applied across capacitor 84, which has its negative plate connected to the anode of the silicon controlled rectifiers 74a and 74b and its positive plat connected to the center tap of winding 76c.

A plot against time of the output of the silicon controlled rectifiers 74a and 74b, which appears across the capacitor 84, can be seen in FIGS. 3b or 4b. These plots show how rectified sine waves are modified by use of the silicon controlled rectifiers which are unable to conduct until triggered by a feedback pulse from the secondary windings of transformers 70a and 70b which are applied between the cathode and trigger electrodes of silicon controlled rectifiers 74a and 74b. Variations in the outputs voltages of the SCRs are dependent upon timing of the feedback pulses. The significance of the frequency of feedback pulses is seen by a comparison in FIGS. 3a and 4a with FIGS. 3b and 4b respectively which have common time scales. However the effect of the pulses on the generation of the waveform of FIGS. 3b and 4b may be better understood by first considering FIGS. 5a and 5b.

FIGS. 5a and 5b show what happens to a half-wave rectified alternating current derived through SCR 74a only. Such characteristics might also occur, for example, where, only SCR 74a is employed and SCR 74b and any other diode is omitted. In such event, of course, pulse circuit 32b might also be omitted with certain minor modifications of the circuitry shown.

As seen in FIG. 5a, when the SCR 74a is not capable of conducting, no trigger pulses are generated. This is because during the positive half cycle a positive potential from the cathode side of the SCR 74a is applied back through resistors 86a and 88a, forming a voltage divider across the base of NPN transistor 90a. During this time current flows through resistors 86a and 88a to the negative terminal 58 of low voltage direct current power supply 54, the base of NPN transistor 90a, will be so biased that the transistor becomes conductive and completely discharges capacitor 64a. As seen in FIG. 5a, this is the case during a half wave interval when no pulses are generated, but as the cathode of SCR 74a becomes negative the transistor 90a is rendered nonconductive and pulses begin to be generated again. Then, the first pulse applied to the trigger electrode of the silicon controlled rectifier 70a will render that SCR conductive as appears from the wave form of FIG. 5b. This means that the portion of the wave form eliminated depends upon the feedback pulse frequency, in that the higher the pulse frequency the sooner the SCR will be turned on and the smaller the portion of the waveform that will be eliminated.

The same thing happens in the full wave rectified system as seen in FIGS. 3b and 4b, except that on alternate half cycles SCR 74b is rendered conductive to fill in the blank spaces. When silicon control rectifier 74b is effective on alternate half cycles, the pulse generator 32a is turned off, just as, when silicon control rectifier 74a is effective, pulse generator 34b is turned off. It can be said then that the respective silicon control rectifiers 74a and 74b will conduct only when the voltage to its cathode is negative and a pulse (actually the first of a series of pulses) is applied to its gate by its respective pulse transformer 70a or 70b. As the cathode of the SCRs 74a and 74b are connected to different terminals of the secondary winding 76c of transformer 76 the voltage at the cathode of SCR 74a will always be of the opposite polarity from the voltage at the cathode of SCR 74b. If SCR 74a conducts during the first half cycle, then SCR 74b will conduct during the second half cycle. Any conduction at all by the SCRs, of course, is dependent upon there being an error signal causing the pulse generators 32a and 32b to generate triggering pulses.

Whether or not, a waveform of the type shown in FIG. 3b or 4b is being generated in the SCR circuit, a conventional full-wave-type rectified current is generated by the circuit of rectifiers 78 and 80 and center tapped secondary 76b. The signals from the two single phase, push-pull rectifiers circuits are necessarily in phase because they are derived from the same AC source. They are added together by the effective series arrangement of capacitors 82 and 84 across which the voltage signals are applied. The combination of the series capacitors 82 and 84 with choke 86 and capacitor 88 provides a smoothing effect so that the output voltage from the DC power supply is effectively a variable direct current negative voltage E, which is the sum of $E_{dc}$ from the diode circuit and $E_{c84}$ from the SCR circuit, as seen in FIGS. 3b and 4b. The amplitude of $E_{c84}$ depends upon the frequency of the feedback pulses as previously explained.

It will be observed that a diode 90 is provided in parallel with capacitor 84 to allow the voltage on the center tap lead 74 to bypass capacitor 84 when that voltage is positive with respect to ground and when SCRs 74a and 74b are both nonconducting. In this case, of course, the circuit of diodes 78 and 80 provides the entire direct current voltage.

It should be noted that the pulses emitted by the SCRs 74a and 74b are used only to boost the voltage $E_{dc}$ across capacitor 88. $E_{dc}$ is always available regardless of whether there is a signal from the SCRs or not. Thus, the power is always available to move the step motor.

From the above it will appear that we have provided a step motor control circuit wherein current through the windings of the step motor may be maintained constant to maintain constant torque at all speeds of the step motor.

We claim:

1. A constant current drive system for a step motor having a rotor and a plurality of windings which, when energized in a specific sequence, will cause said motor to rotate in one direction an incremental step at a time, comprising:
   a power supply, including
   an AC power supply together with rectifier and smoothing means for producing direct current,
   gate controlled switch means between the AC power supply and the smoothing means, normally stopping flow from the AC power supply, the gate of said switch means being responsive to a pulse signal to allow the voltage to pass said switch means,
   sequence switching means for connecting said power supply selectively and in a predetermined sequence to each of said windings,
   motor control responsive to drive pulses and acting upon the sequencing switching means to cause said sequence switching means to connect said power supply to said windings in proper sequence to produce successive incremental movements of said rotor,
   sensing means for sensing the amount of current passing through the windings, and
   feedback means responsive to the current sensed by the sensing means including comparison means providing a standard of desired current level and producing an error signal in the form of a pulse chain, the repetition rate of which is directly proportional to the amount of deviation from said standard, said pulse chain being synchronized with said AC power supply and acting upon the trigger of said gate controlled switch means to eliminate a forward portion of the rectified AC wave for a time corresponding to the period of the first pulse after the wave is in order to adjust the current passing through the windings so that uniform current is provided at all times.

2. The constant current drive system of claim 1 in which the gate controlled switch means is at least one silicon controlled rectifier 3. The constant current drive system of claim 1 in which the means generating the pulses in synchronism with the AC power source is a relaxation oscillator.

4. The constant current drive system in accordance with claim 3 in which the sensing means is at least one resistor in series with the motor windings, the voltage drop across which is employed to generate a feedback signal.

5. The constant current drive system of claim 4 in which filter means is provided to smooth the voltage appearing across the sensing means resistor.

6. A constant current drive system of claim 5 in which an operational amplifier operates on smooth voltage for comparison with a set point value and generates an error signal if there is a difference detected.

7. The constant current drive system of claim 6 in which the error signal generated by the operational amplifier is provided to the relaxation oscillator to generate pulses at a frequency increasing with the size of the error detected.